United States Patent
Lehmann et al.

(12)

(10) Patent No.: US 6,491,128 B1
(45) Date of Patent: Dec. 10, 2002

(54) STEERING DEVICE FOR A MOTOR VEHICLE

(75) Inventors: Michael Lehmann, Aschaffenburg; Albert Steinmüller, Westerngrund; Klaus Limberg, Pforzheim; Tino Zink, Neulingen; Frank Schneider, Pforzheim, all of (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 09/557,888

(22) Filed: Apr. 21, 2000

(30) Foreign Application Priority Data

Apr. 22, 1999 (DE) ..................... 299 07 180 U

(51) Int. Cl.⁷ .............................. B60K 26/02

(52) U.S. Cl. ............... 180/315; 180/402; 274/502

(58) Field of Search ............... 180/315, 332, 180/333, 400, 402, 403, 78; 74/500.5, 501.6, 502, 484 R, 485

(56) References Cited

U.S. PATENT DOCUMENTS 3,312,123 A    4/1967   Rumpf
6,039,142 A  *  3/2000  Eckstein et al. ............ 180/333

FOREIGN PATENT DOCUMENTS

DE           19625498          11/1997

* cited by examiner

Primary Examiner—Kevin Hurley
(74) Attorney, Agent, or Firm—Tarolli, Sundheim, Covell, Tummino & Szabo L.L.P.

(57) ABSTRACT

The invention relates to a device for generating a steering signal for controlling an actuating drive for an adjustment of steerable wheels on motor vehicles, in particular passenger vehicles. The device comprises a non-rotatable frame having an axis of symmetry and curved guiding portions, as well as a pair of handles intended for transmitting actuating forces and being coupled with each other. The handles are mounted on the guiding portions so as to be displaceable in same direction and are able to be displaced along the guiding portions and relative to the axis of symmetry to a limited extent. The device further comprises a measurement transducer for generating one of an electrical and electronic signal for determining a position of the handles relative to the frame.

51 Claims, 4 Drawing Sheets

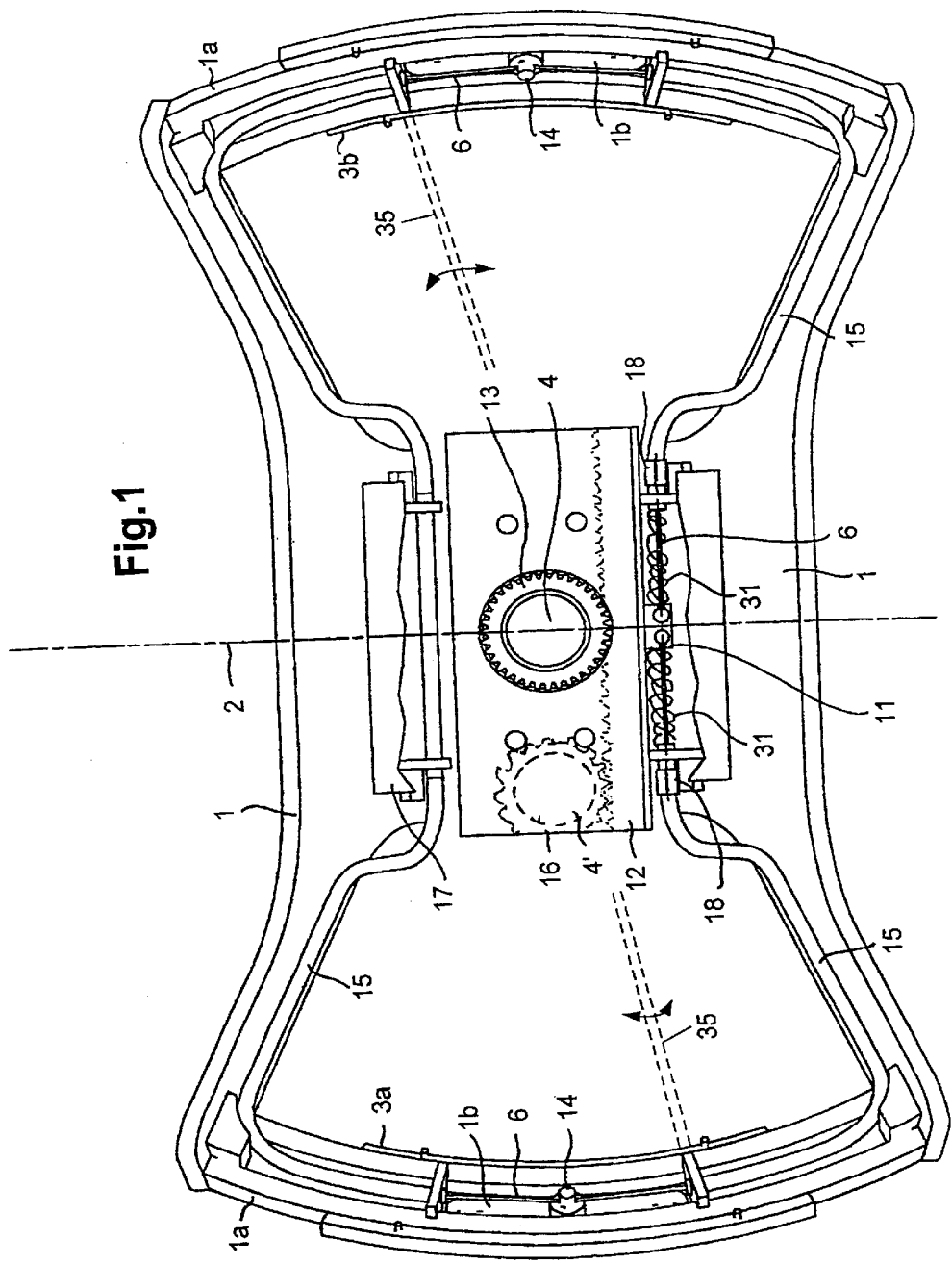

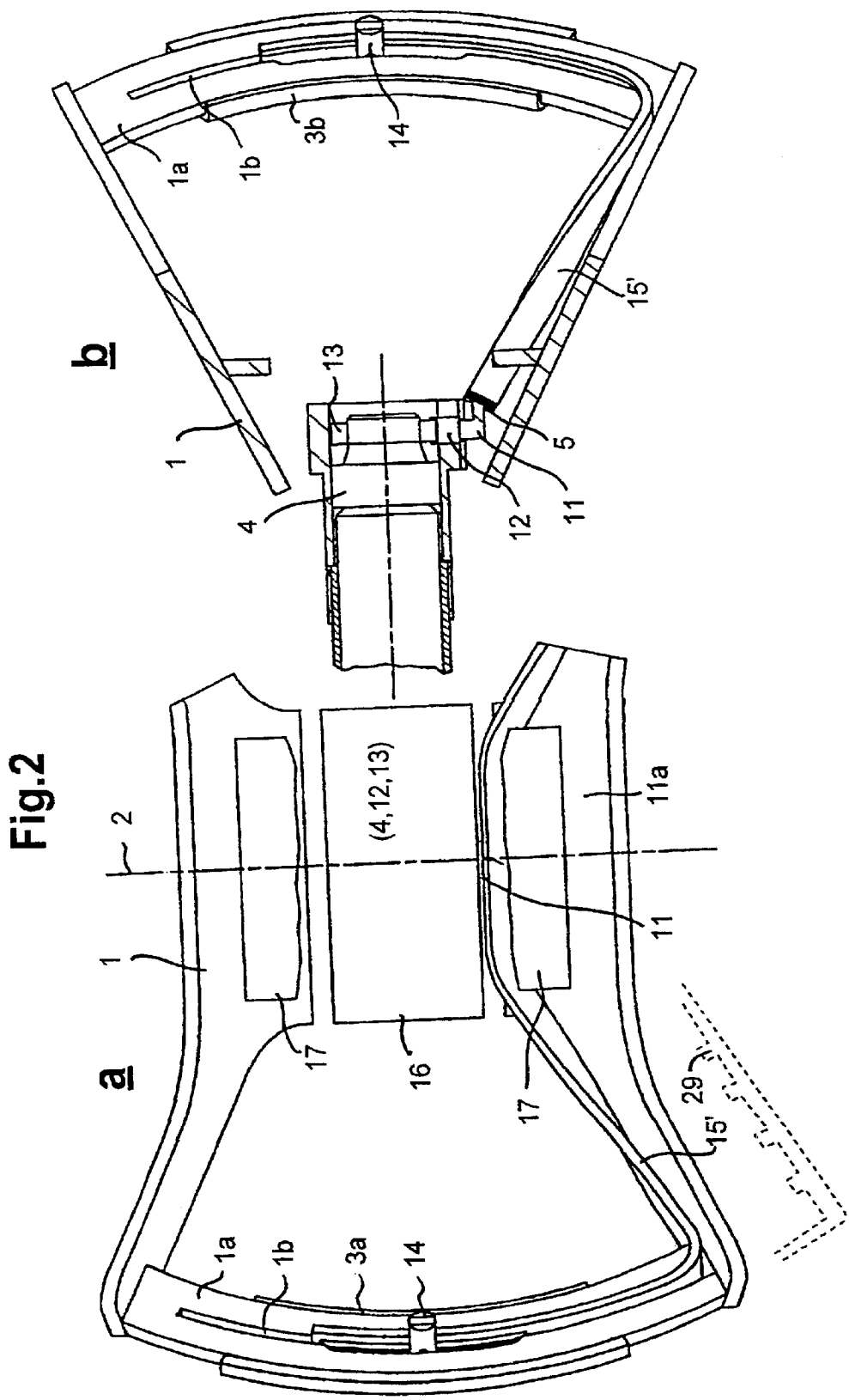

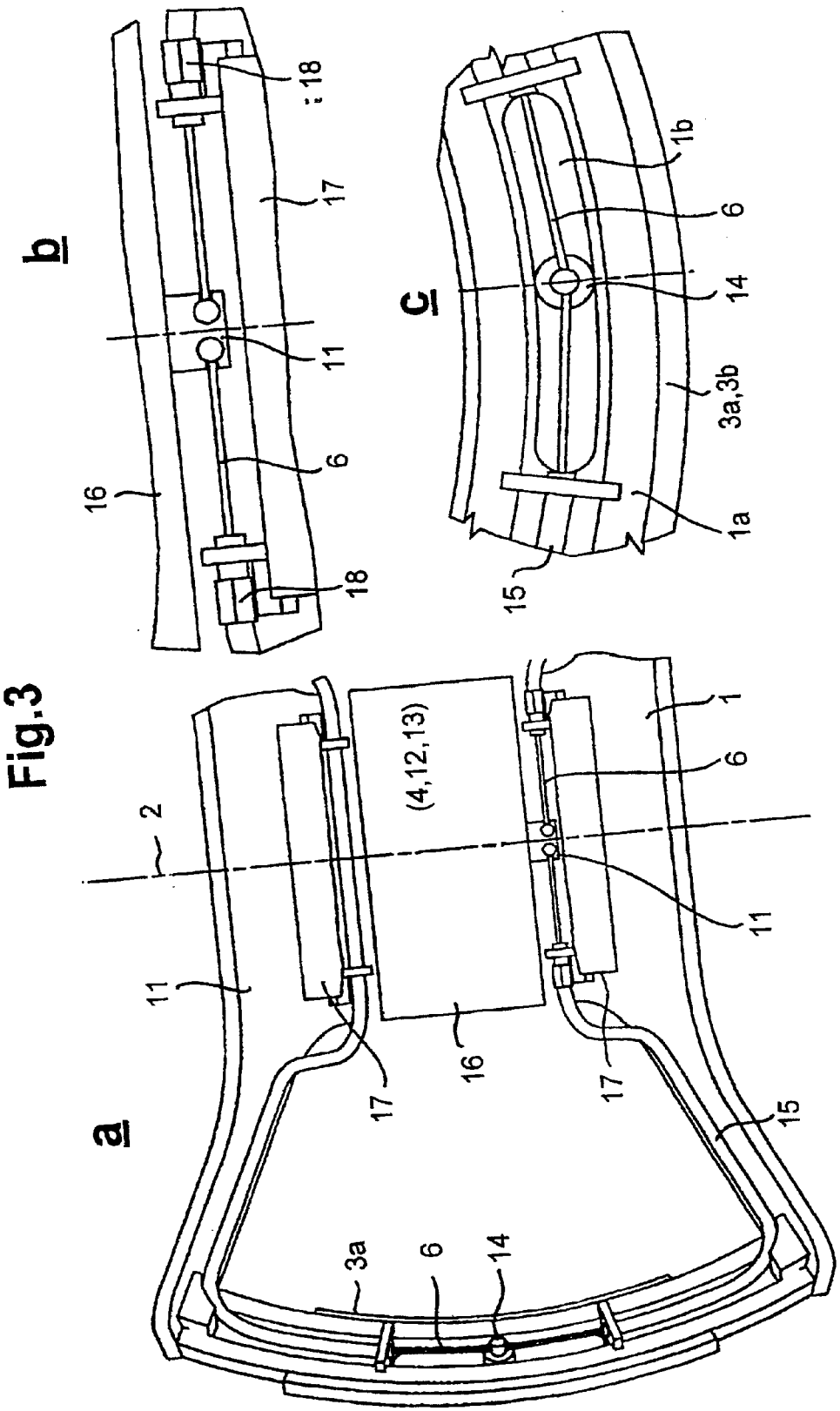

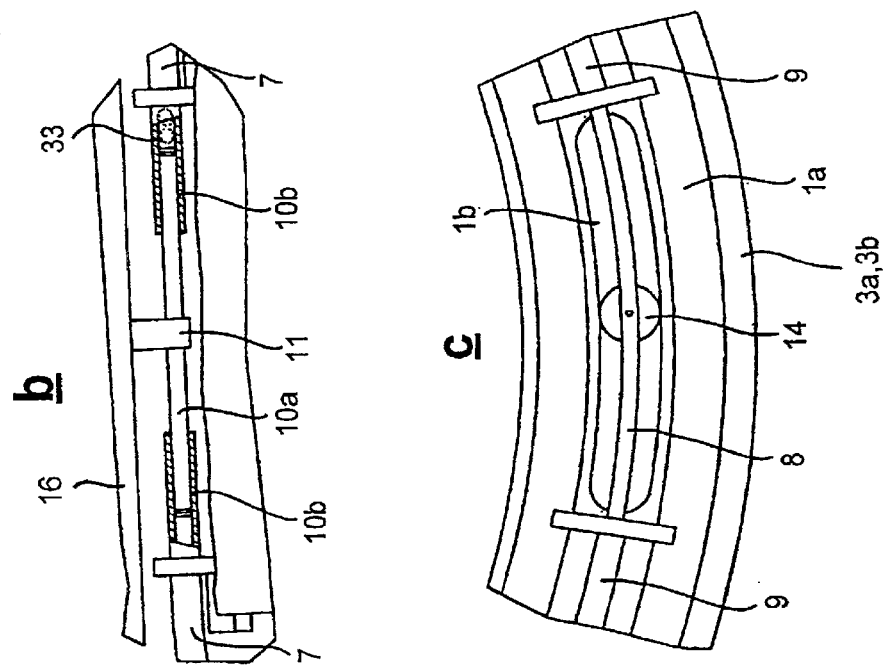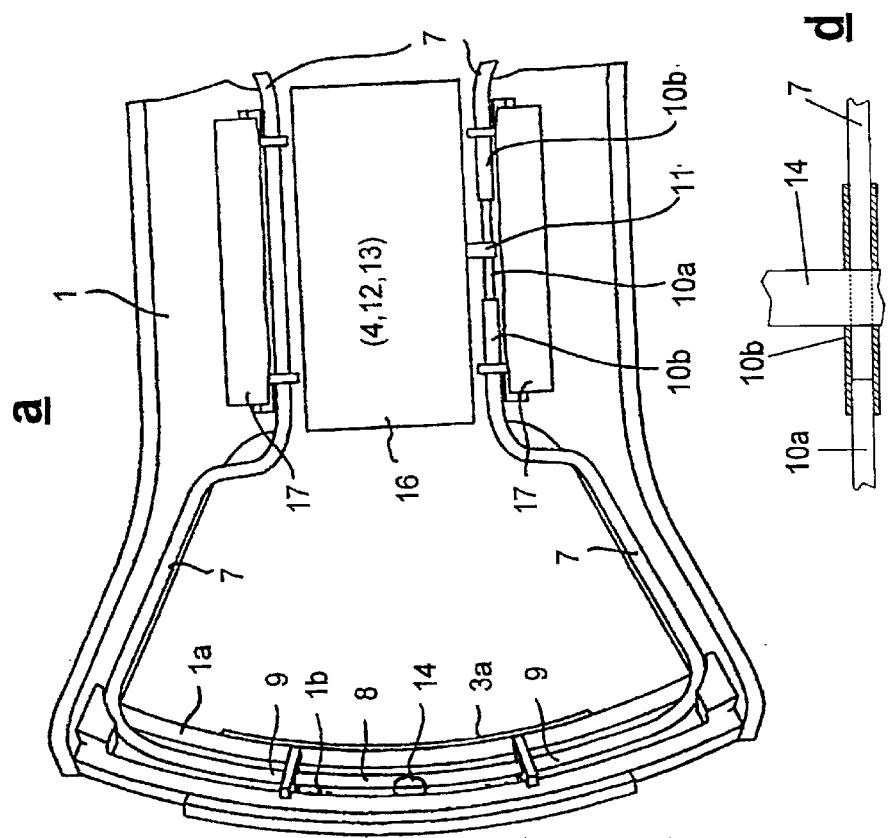

STEERING DEVICE FOR A MOTOR VEHICLE

TECHNICAL FIELD

The invention relates to a device for generating a steering signal for controlling an actuating drive for an adjustment of steerable wheels on motor vehicles, in particular passenger vehicles.

BACKGROUND OF THE INVENTION

For reasons of safety and comfort, endeavors have been made for some time, apart from the actuation for the horn contact, to arrange more and more devices for actuation of the most varied of vehicle functions (lamp switches, windscreen wipers, window lifters, radio, heating, telephone) directly in the steering wheel, so that the driver is no longer forced to take one hand from the steering wheel to switch on such functions. It is immediately clear that the transmission of electrical signals generated on a rotatable steering wheel to the adjusting members fixedly arranged in the bodywork of the motor vehicle is not without problems, in particular when a plurality of different signals has to be transmitted. Therefore, already fixed or substantially fixed steering devices were proposed, in which the mechanical coupling between steering device and steering linkage has been replaced by a measurement transducer on the steering device and an actuating drive on the steering linkage. With such steering devices, one can dispense with the conventional maximum 2 to 4 revolutions to achieve the maximum steering angle of the wheels and one can limit the actual adjustment distance for the actuation of the steerable wheels to a rotation angle of 30 degrees or less. Thereby, the transmission of a plurality of signals is not a problem, because the actuating devices are either arranged on parts of the steering device which are constructed so as to be fixed relative to the bodywork, or else on parts of the steering device which are only able to be moved by a small rotation angle relative to the bodywork, so that one manages with simple lead loops in order to be able to produce an electrical connection between rotating and fixed parts.

A mechanical uncoupling and an electrical transmission of the steering command to the steerable wheels is also necessary if one wishes to achieve a driver-independent vehicle stabilizing by means of modern safety systems and in so doing also wishes to influence the adjustment angle of the steerable wheels.

The development of such steering devices is still at its beginnings and the proposals made hitherto still do not satisfy all requirements.

BRIEF SUMMARY OF THE INVENTION

The invention provides a steering device which is of simple construction and which, vis-a-vis conventional steering wheels, demands from the driver only little effort to get into the way of it. This is achieved in a device which comprises a non-rotatable frame having an axis of symmetry and curved guiding portions, as well as a pair of handles intended for transmitting actuating forces and being coupled with each other. The handles are mounted on the guiding portions so as to be displaceable in same direction and are able to be displaced along the guiding portions and relative to the axis of symmetry to a limited extent. The device further comprises a measurement transducer for generating one of an electrical and electronic signal for determining a position of the handles relative to the frame.

The proposed steering device has the advantage that it can readily take the place of conventional steering wheels, without the driver having to assume a completely different steering-and sitting position. The steering commands are also introduced through an accustomed movement of the handles which are coupled with each other, and owing to the comparatively short adjustment distance, no alteration of the position of the hands is necessary as in conventional steering wheels, which is to be regarded as advantageous with regard to safety and comfort.

BRIEF DESCRIPTION OF THE DRAWINGS

FIG. 1 shows a first embodiment of the steering device according to the invention in top view.

FIGS. 2a, 2b show a second embodiment of the idea of the invention, partially in top view (FIG. 2a) and partially in section (FIG. 2b).

FIGS. 3a to 3c show details of the embodiment according to FIG. 1.

FIGS. 4a to 4d show details of further embodiments of the idea of the invention.

DETAILED DESCRIPTION OF THE PREFERRED EMBODIMENTS

The embodiment of the idea of the invention illustrated in FIG. 1 comprises a frame 1 with curved guiding portions in the form of guide rails 1a on and along which a pair of handles 3a, 3b, coupled with each other and likewise being curved, are mounted so as to be displaceable along the guiding portions by a limited extent in same direction to the axis of symmetry 2. In the illustrated example embodiment, the guide rails 1a are constructed in the form of circle segments, so that the handles 3a, 3b can perform a circular movement about a point of the axis of symmetry 2 which can also be a central axis. This circular movement corresponds to the usual hand guidance in the case of a rotatable steering wheel, so that the actuation of the steerable wheels does not require any re-acclimatization for the driver. The handles 3a, 3b each consist of a lower and an upper shell, merely the lower shell being illustrated in FIG. 1. In the guide rails 1a, slits 1b in the shape of circular arcs are formed, into which a transmission element 14, firmly connected with the handles 3a, 3b, engages. This transmission element 14 is connected with a cable 6 which is guided in the frame 1 in a cable guide 15, as in the case of a known Bowden cable. In this way, the two handles 3a, 3b are coupled with each other mechanically, and they can therefore automatically only be actuated in same direction. Screw elements 18 or pre-stressed elements, not shown, can be used for tensioning the cable, as are usually in the known Bowden cables.

The ends of the cable 6 are connected with a transmission element 11, which in turn is fastened to a toothed rack 12 which engages into a toothed wheel 13 cooperating with a measurement transducer 4 for generating an electrical or electronic signal. The parts last mentioned are arranged in a housing 16 which is situated behind a covering 17 which is only partially illustrated.

With a movement of the handles 3a, 3b in same direction, the cable 6 is entrained via the transmission element 14, so that its movement is transferred onto the transmission element 11 and hence finally onto the measurement transducer 4. Through a movement of the handles 3a, 3b therefore a signal can be generated for an adjustment member which acts on the steering linkage. Preferably, the signal generated is proportional to the relative displacement between handles and frame. Springs 31 act as a means for automatically returning the handles into the neutral initial position which is illustrated.

The previously described components are illustrated again in FIGS. 3a to 3c, in which FIG. 3a corresponds substantially to the left-hand part of FIG. 1 and only differs therefrom in that the housing 16, in which the measurement transducer 4, the toothed rack 12 and the toothed wheel 13 are situated, is illustrated closed here. FIGS. 3b and 3c show once again on an enlarged scale the connecting of the cable 6 to the transmission elements 11 and 14 and also the configuration of the slit 1b in the guide rail 1a. Further explanations to FIGS. 3a to c are not necessary. FIGS. 2a and 2b show a second embodiment of the idea of the invention which differs from that according to FIG. 1 merely in that in place of a cable, a band 5 is used and that instead of a cable guide 15 a band guide 15' is provided. A further difference can be seen in that the band guide 15' other than the cable guide 15 is provided only in the lower part of the frame 1 and that the transmission elements 11 and 14 are also the slit 1b in the guide rail 1a are designed to the cross-sectional shape of the band. The handles 3a and 3b are in turn constructed as two half shells, of which in FIGS. 2a and 2b only the lower shells are illustrated. The housing is in turn designated by 16, in which the measurement transducer 4, a toothed rack 12 and a toothed wheel 13 are accommodated. From the sectional illustration according to FIG. 2b it can be seen how the transmission element 11 is connected with the band 5 and that it moves via the toothed rack 12 the toothed wheel 13 and, hence, the measurement transducer 4. In FIG. 2b, a guiding portions illustrated as being turned through 90° into the drawing plane. Alternatively, a toothed belt 29 may also be used instead of the band 5; in that case the toothed rack 12 may be omitted.

In the embodiment according to FIGS. 4a to c, the mechanical coupling of the handles 3a, 3b according to the embodiments of FIGS. 1 to 3 is replaced by a hydraulic coupling, which comprises a duct system 7, arranged in the frame 1, with piston/cylinder units 8, 9, 10a, 10b. The handles 3a, 3b are arranged in the guide rail 1a of the frame 1 as in the embodiments hitherto described, so as to be displaceable about a point of the axis of symmetry on a circular arc, reach through a slit 1b in the guide rail 1a with a transmission element 14 and are connected with a piston 8 which engages in the cylinder 9 mounted stationary in the housing and, hence, can bring about a displacement of the hydraulic fluid situated therein. A second piston/cylinder unit 10a, 10b is connected with the transmission element 11 which, as in the embodiments described hitherto, moves a measurement transducer 4 via a toothed rack 12 and a toothed wheel 13, the latter components being accommodated in the housing 16 so as to be not visible in the illustration. Parts of a covering are designated by 17, which covers the housing 16.

In FIGS. 4b and 4c once again the connection of the transmission elements 11 and 14 to the pistons 10a and 8 is illustrated, which cooperate with the cylinders 10b and 9 and are coupled with each other hydraulically via the duct system 7. Alternatively, the piston 10a could also be mounted stationary in the frame 1 and the cylinder 9 could be coupled with the handle, as can be seen from FIG. 4d. Further, as outlined in FIG. 4b, balls 33 also may fill the duct system 7 and act in a force-transmitting manner.

In all illustrated example embodiments, the steering movement introduced via the handles 3a, 3b is transferred to a centrally arranged measurement transducer, in which the control signal for the actuating drive of the steering linkage is generated. The idea of the invention is of course not limited to these embodiments. It is conceivable for example that the handles 3a, 3b are coupled mechanically with each other directly via a rotatable lever 35 as outlined in FIG. 1 and that one measurement transducer each is associated directly to the handles 3a, 3b. Thereby, a steering device according to the invention would be provided, which is doubly secured against the failure of a measurement transducer. A greater security with respect to the measurement transducer can, however, of course also be achieved in that two or more centrally arranged measurement transducers are provided (see the second measurement transducer 4' in FIG. 1), which are actuated as in the embodiments of FIGS. 1 to 4.

What is claimed is:

1. A device for generating a steering signal for controlling an actuating device for an adjustment of steerable wheels on motor vehicles, in particular passenger vehicles, said device comprising:

a non-rotatable frame having an axis of symmetry and having stationary, non-rotatable curved guiding portions in the form of guide rails, a pair of handles coupled with each other to move together, said handles having portions which are manually gripped, said portions which are manually gripped engaging said guiding portions and being displaceable along and relative to said guiding portions and in the same direction and relative to said axis of symmetry to a limited extent, and a measurement transducer for generating one of an electrical and electronic signal for determining a position of said handles relative to said frame.

2. The device according to claim 1, wherein a flexible connecting means is provided which couples said handles to synchronize displacement of said handles and which is displaceably mounted to said frame.

3. The device according to claim 1, wherein one of a flexible band and cable guided in said frame is provided, said handles being connected with each other by means of said one of a flexible band and cable, respectively.

4. The device according to claim 3, wherein an elastic member is provided for tightening said one of a flexible band and cable, respectively.

5. The device according to claim 1, wherein a duct system for hydraulic fluid is provided, said handles being coupled with each other by means of said duct system.

6. The device according to claim 5, wherein first piston/cylinder units are provided, wherein each of said two handles has a first piston-cylinder unit associated with it and wherein at least one second piston/cylinder unit and a transmission element are provided for transferring said movement of said handles to said measurement transducer.

7. The device according to claim 6, wherein said first piston/cylinder units each comprise a piston and a cylinder, said pistons each being connected with one of said handles, said cylinders being mounted so as to be stationary in said frame.

8. The device according to claim 6, wherein said first piston/cylinder units each comprise a piston and a cylinder, said cylinders being connected with one of said handles, said pistons being mounted so as to be stationary in said frame.

9. The device according to claim 1, wherein a lever is provided which is rotatable about a point on said axis of symmetry, said handles being connected rigidly with each other by means of said lever.

10. The device according to claim 1, wherein a duct is formed in said frame, said duct having a duct diameter and being filled with balls matched to said duct diameter, and said handles being coupled with each other by means of said balls.

11. The device according to claim 1, wherein toothed belts and a toothed wheel are provided, said toothed belts being guided in said frame and coupled with each other by means of said toothed wheel, and said handles being connected at one of their ends by one toothed belt and at their other ends by another toothed belt.

12. The device according to claim 1, wherein means are provided for an automatic restoring of said handles into a neutral starting position.

13. The device according to claim 1, wherein at least two measurement transducers are provided which are independent of each other.

14. The device according to claim 1, wherein said measurement transducer generates a signal which is proportional to a relative displacement between said handles and said frame.

15. The device according to claim 1, wherein said frame is arranged in front of the driver.

16. A device for generating a steering signal for controlling an actuating drive for an adjustment of steerable wheels on motor vehicles, in particular passenger vehicles, said device comprising:
   a non-rotatable frame having an axis of symmetry and having curved guiding portions which are arranged opposite to each other with respect to said axis of symmetry,
   said frame having a connecting portion which connects said opposite guiding portions, said connecting portion being arranged between said opposite guiding portions,
   a pair of handles coupled with each other to move together, said handles having portions which are manually gripped, said handles being mounted on said opposite guiding portions and displaceable along and relative to said guiding portions and in the same direction and relative to said axis of symmetry to a limited extent, and
   a measurement transducer for generating one of an electrical and electronic signal for determining a position of said handles relative to said frame.

17. The device according to claim 16, wherein said guiding portions are stationary and non-rotatable curved guide rails.

18. The device according to claim 16, wherein one of a flexible band and cable guided in said frame is provided, said handles being connected with each other by means of said one of a flexible band and cable, respectively.

19. The device according to claim 16, wherein an elastic member is provided for tightening said one of a flexible band and cable, respectively.

20. The device according to claim 16, wherein a duct system for hydraulic fluid is provided, said handles being coupled with each other by means of said duct system.

21. The device according to claim 20, wherein first piston/cylinder units are provided, wherein each of said two handles has a first piston/cylinder unit associated with it and wherein at least one second piston/cylinder unit and a transmission element are provided for transferring said movement of said handles to said measurement transducer.

22. The device according to claim 21, wherein said first piston/cylinder units each comprise a piston and a cylinder, said pistons each being connected with one of said handles, said cylinders being mounted so as to be stationary in said frame.

23. The device according to claim 21, wherein said first piston/cylinder units each comprise a piston and cylinder, said cylinders each being connected with one of said handles, said pistons being mounted so as to be stationary in said frame.

24. The device according to claim 16, wherein a lever is provided which is rotatable about a point on said axis of symmetry, said handles being connected rigidly with each other by means of said lever.

25. The device according to claim 16, wherein a duct is formed in said frame, said duct having a duct diameter and being filled with balls matched to said duct diameter, and said handles being coupled with each other by means of said balls.

26. The device according to claim 16, wherein toothed belts and a toothed wheel are provided, said toothed belts being guided in said frame and coupled with each other by means of said toothed wheel, and said handles being connected at one of their ends by one toothed belt and at their other ends by another toothed belt.

27. The device according to claim 16, wherein means are provided for an automatic restoring of said handles into a neutral starting position.

28. The device according to claim 16, wherein at least two measurement transducers are provided which are independent of each other.

29. The device according to claim 16, wherein said measurement transducer generates a signal which is proportional to a relative displacement between said handles and said frame.

30. The device according to claim 16, wherein said frame is arranged in front of the driver.

31. A device for generating a steering signal for controlling an actuating drive for an adjustment of steerable wheels on motor vehicles, in particular passenger vehicles, said device comprising:
   a non-rotatable frame having an axis of symmetry and curved guiding portions,
   a pair of handles coupled with each other, which are mounted on said guiding portions so as to be displaceable along and relative to said guiding portions and in the same direction and which are able to be displaced along said guiding portions and relative to said axis of symmetry to a limited extent,
   a flexible connecting means which couples said handles to synchronize displacement of said handles, and
   a measurement transducer for generating one of an electrical and electronics signal for determining a position of said handles relative to said frame.

32. The device according to claim 31, wherein an elastic member for tightening said flexible connecting means is provided.

33. The device according to claim 31, wherein said guiding portions are stationary and non-rotatable.

34. The device according to claim 31, wherein said guiding portions are guide rails.

35. The device according to claim 31, wherein said guiding portions are circle-segments.

36. The device according to claim 31, wherein one of a flexible band and cable guided in said frame is provided, said handles being connected with each other by means of said one of a flexible band and cable, respectively.

37. The device according to claim 31, wherein toothed belts and a toothed wheel are provided, said toothed belts being guided in said frame and coupled with each other by means of said toothed wheel, and said handles being connected at one of their ends by one toothed belt and at their other ends by another toothed belt.

38. A device for generating a steering signal controlling an actuating drive for an adjustment of steerable wheels on motor vehicles, in particular passenger vehicles, said device comprising:

a non-rotatable frame having an axis of symmetry and having stationary, non-rotatable curved guiding portions in the form of guide rails, a pair of handles intended for transmitting actuating forces and being coupled with each other, which are mounted on said guiding portions so as to be displaceable in the same direction and which are able to be displaced along said guiding portions and relative to said axis of symmetry to a limited extent, and at lest two measurement transducers for generating one of an electrical and electronic signal for determining a position of said handles relative to said frame, said transducers being independent from each other.

39. The device according to claim 38, wherein said guiding portions are stationary and non-rotatable.

40. The device according to claim 38, wherein said guiding portions are guide rails.

41. The device according to claim 38, wherein said guiding portions are circle-segments.

42. The device according to claim 38, wherein one of a flexible band and cable guided in said frame is provided, said handles being connected with each other by means of said one of a flexible band and cable, respectively.

43. The device according to claim 42, wherein an elastic member is provided for tightening said band and said cable, respectively.

44. The device according to claim 38, wherein a duct system for hydraulic fluid is provided, said handles being coupled with each other by means of said duct system.

45. The device according to claim 44, wherein first piston/cylinder units are provided, wherein each of said two handles has a first piston/cylinder unit associated with it and wherein at least one second piston/cylinder unit and a transmission element are provided for transferring said movement of said handles to said measurement transducer.

46. The device according to claim 45, wherein said first piston/cylinder units each comprise a piston and a cylinder, said piston each being connected with one of said handles, said cylinders being mounted so as to be stationary in said frame.

47. The device according to claim 45, wherein said first piston/cylinder units each comprise a piston and a cylinder, said cylinders each being connected with one of said handles, said pistons being mounted so as to be stationary in said frame.

48. The device according to claim 38, wherein a lever is provided which is rotatable about a point on said axis of symmetry, said handles being connected rigidly with each other by means of said lever.

49. The device according to claim 38, wherein a duct is formed in said frame, said duct having a duct diameter and being filled with balls matched to said duct diameter, and said handles being coupled with each other by means of said balls.

50. The device according to claim 38, wherein toothed belts and a toothed wheel are provided, said toothed belts being guided in said frame and coupled with each other by means of said toothed wheel, and said handles being connected at one of their ends by one toothed belt and at their other ends by another toothed belt.

51. A device for generating a steering signal for controlling an actuating drive for an adjustment of steerable wheels on motor vehicles, in particular passenger vehicles, said device comprising;

a non-rotatable frame having an axis of symmetry and having curved guiding portions which are arranged opposite to each other with respect to said axis of symmetry, said frame having a connecting portion extending approximately transverse to said axis of symmetry and between said opposite guiding portions for connecting end portions of said opposite guiding portions;

a pair of handles coupled with each other to move together, said handles having portions which are manually gripped, said portions which are manually gripped having ends spaced apart from said end portions of said opposite guiding portions, said portions which are manually gripped engaging said opposite guiding portions and being displaceable along and relative to said opposite guiding portions and in the same direction between said end portions of said opposite guiding portions and relative to said axis of symmetry to a limited extent, and a measurement transducer for generating one of an electrical and electronic signal for determining a position of said handles relative to said frame.

* * * * *